Figures 1, 2:
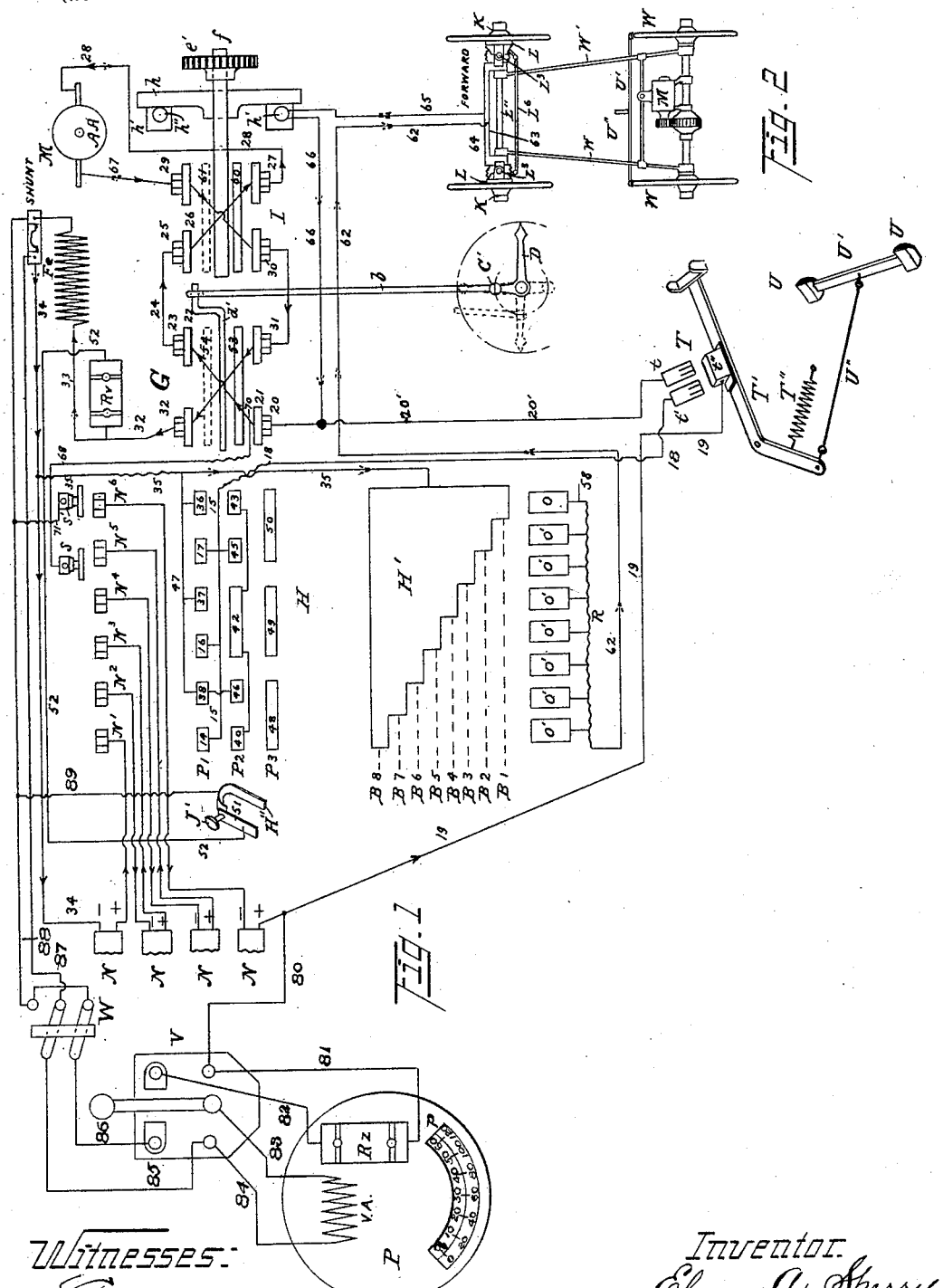

No. 641,412. Patented Jan. 16, 1900.
E. A. SPERRY.
SYSTEM OF ELECTRIC CIRCUITS AND BRAKES FOR VEHICLES.
(Application filed Sept. 16, 1899.)
(No Model.)

Witnesses:
Inventor.
Elmer A. Sperry.
by Buckingham & Evart,
Attys.

UNITED STATES PATENT OFFICE.

ELMER A. SPERRY, OF CLEVELAND, OHIO.

SYSTEM OF ELECTRIC CIRCUITS AND BRAKES FOR VEHICLES.

SPECIFICATION forming part of Letters Patent No. 641,412, dated January 16, 1900.

Application filed September 16, 1899. Serial No. 730,692. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Systems of Electric Circuits and Brakes for Vehicles, of which the following is a specification.

My invention relates to a system of electric circuits and brakes for vehicles; and it consists in various arrangement of parts and construction of details, arrangement of circuits, and means for changing such relation in connection with separate generating units, motor or motors, electric brakes, resistances, &c.

The invention also consists in various arrangement of circuits, switches, and meters in their proper combination and relation to the generator, motor, and braking devices of the vehicle.

The invention further consists of details of construction and arrangement of parts tending to cheapen the production of electric vehicles. These objects are attained by mechanism, details, and circuits shown in the accompanying drawings, in which—

Figure 1 is a diagrammatic view of the electric circuits of the vehicle. Fig. 2 is a diagrammatic view of the running-gear of the carriage, showing motor and brake.

In the drawings like letters and numerals of reference indicate similar parts throughout both views.

The system of control or arrangement of electrical circuits of the vehicle is shown in diagram in Fig. 1. It will be seen that the electricity is generated by separate units N N N N, each of which may represent a group of generators, the positive and negative terminals of which are coupled, as shown, to the various circuit-manipulating devices. Their function and relation remain now to be pointed out in detail. To the right is observed the gear or segment $e'$, by means of which the controller-shaft $f$ is manipulated. On this shaft are mounted the reversing-switch I and the controller H, the controller having two active positions, one either side of the "off" position or position of rest, the latter having eleven active positions, three on the power side, indicated by P' P² P³, and B' to B⁸, as will be readily seen, indicating the brake positions. The brushes coöperating with these various contacts are illustrated by N' to N⁶, respectively, and those coöperating with the contacts B' to B⁸ are represented by O and O' O', &c. These are suitably connected to the resistance R, as indicated. The reversing-switch G is seen mounted upon its shaft $d'$ and operated by the crank and links $b$ from the crank-pin C' and pointer D. On the two reversing-switches I and G these contacts are shown with their electrical connections. Leading from the reversing-switch G and also the controller H are flexible wires, (indicated by the waving lines,) which are numbered in the following description.

When the controller is so turned that the brushes N engage the row P' of contacts, it will be seen that the current flows through the motor in direction of the arrows, as follows: Coming from each of the generators N, it reaches brush N', contact 14, wire 15, brush N³, contact 16, wire 15, brush N⁵, contact 17, wire 15, flexible wire 18, and from the last generator by wire 19, switch T, wire 20' to brush 20. Suppose now that the reversing-switch be in the position shown in Fig. 1. The current will enter contact 21, contact 22, brush 23, wire 24, brush 25, contact 26, contact and brush 27, wire 28, through the armature A A of the motor to brush 29, in the direction of the arrow-heads in full lines, to brushes 30, 31, and 32, wire 33, field F$e$, wire 34 to the negative of the first battery, and wire 35 (part of which is flexible) to contacts 36, 37, and 38, to brush N², returning the current to the second generator, brush N⁴, returning the current to third generator, and brush N⁶, returning current to fourth generator, which will thus be seen to have been coupled to the motor in parallel.

It will readily be understood that the relation between the reversing-switch I and the controller H is fixed and the direction of the current through it is always as indicated in any of the three power positions.

Taking now the second power position, obtained by turning the controller in such a way that the brushes N' to N⁶ rest upon the second row of contacts—viz., P²—we notice that the current generated by the first generator N arrives at brush N', contact 40, wire 41, and the current coming from the second generator arrives at $N^3$, contact 42, passes back through brushes $N^4$ and $N^6$, the latter by way of contact 43 and wire 44, to the lower pair of generators, from whence it flows to the brush $N^5$, contact 45, wire 15, and thence, as before, by flexible wire 18, joined by current from the last generator, passing wire 19, switch T, and wire 20' to contact 20, and thence through the motor or motors back to the negative terminals of the first two generators by wires 34 and 35, by way of wire 47, from contact 46, brush $N^2$ to the negative of the second generator N, at which point the circuit is complete. Thus it will be seen in this position the motor or motors receive current from two of the generators in multiple, coupled in series with two other of the generators.

When the controller is turned to the position $P^3$, the generators are then all in series, the current passing as follows: from the positive of the first generator to brush N', contact 48, brush $N^2$; second generator, brush $N^3$, contact 49, brush $N^4$; third generator, brush $N^5$, contact 50, brush $N^6$; fourth generator, wire 19, switch T, wire 20', brush 20, to motor and fields and back to the first generator, by wire 34, exactly as above pointed out in reference to the two other power positions. It will be noticed that while in this last power position only the contact H'' is brought into position, so that contact 51 may be forced into electrical connection therewith, whereupon the current from wire 33 will be diverted from the field through the variable resistance $Rv$ and wires 52, 88, and 89, thus weakening the field or fields $Fe$ and giving a higher rotative speed to the armature or armatures A A. Furthermore, it will be seen that if the reversing-handle D is so operated that the long contacts 53 and 54 are brought under the brushes 20, 23, 31, and 32, in this case the current arriving at brush 20 will pass over on contact 53 to brush 31, and therefore pass the armature in the directions opposite to the arrow-heads, (full lines,) and not resume the direction of the arrow-heads until it again arrives at brush 32, thus giving a complete reversing action to the motor or motors M connected. It will thus be seen that the motor is a reversible motor, and when reversed while in motion may become a generator, the currents acting through circuits described in following specification.

The currents from the batteries in passing to the machine are made to pass through the switch T, which is operated by a lever or pedal T' and retracted by spring T'', operating the brake-beam U' by means of link U'' for the purpose of applying the mechanical brakes U U. These may be of any type, those shown coöperating with the periphery of the wheel W. (See Fig. 2.) Attention may be called at this point to the reach-rods W' W', which connect the forward and rear axle, and also to the link $L^6$, connecting the two swiveling or steering wheels for simultaneous movement.

Returning now to the switch T, it will be noticed that it is a three-point switch and is coupled to wire 66 and contact 20 by wire 20'. Wire 18 couples contact $t'$ with certain of the controller-contacts used in the parallel and series-parallel arrangement of generators N, and the wire 19 serves to bring the third contact $t''$ into electrical communication with the generators or batteries N. The switch T, which operates when the mechanical brake is actuated, performs four important functions—first, that of opening the main circuit when the mechanical brake is applied; second, the leads of the switch are so arranged that it is inserted with the charging-terminal by wire 20' and brush 20, contact 70, wire 68, terminal S, and thus may be used as a charging-switch to open and close the charging-circuit, and thus control the charging-current; third, the switch-circuits are so adjusted as not to interfere with the dynamo-generated current used in electric braking when the switch is open in applying the mechanical brake, so that both brakes may work simultaneously; fourth, the three-point feature already referred to permits the isolation of the parallel and series-parallel contacts from the controller when disconnecting the battery from the main circuit. This is for the purpose of rendering the circuit open at all positions of the controller when the switch T is open-circuited.

Referring now to the volt-ammeter P, it will be seen to be a double-scale instrument provided with the ammeter-operating coil VA and resistance $Rz$. These are connected by wires 81, 82, 83, and 84 to a switch V. The switch is also connected by wires 80, 85, and 86 to the positive end of the last battery or generator M and also to the reversing-switch W, thence by wires 87 and 88 to the two ends of the ammeter-shunt marked "shunt." To the far end of the shunt will be seen connected the other charging-terminal S', so that the current in entering the negative end of the battery N by wire 34 will be compelled to pass through the shunt, and therefore register on the ammeter; and speed-switch H'' will also be seen to be connected to wire 88, reaching to the far end of the shunt, so that during the act of shunting the field the ammeter or its shunt will not be short-circuited or affected. It will readily be understood that any ammeter may be used instead of the one with the shunt, as shown, for indicating the current. The advantage, however, of the peculiar kind of instrument illustrated is that in a single instrument, while operating the switch V, either the amperes or volts may be read, and by employing in conjunction with the ammeter the reversing-switch W the charging-current may be read as well as the currents operating the machine. Another point will be readily understood, that by placing the ammeter in the peculiar relation in circuit as indicated—i. e., between the field and wire 35—the ammeter may also be used to register the current employed in electric brake, and it will be seen that no manipulation of switches is required while changing from motor to generator, as the correct polarity will be constantly maintained within the ammeter and current may be instantly read while either braking or operating the vehicle.

It will be noticed from the figures that upon the controller being turned backward, so that the contacts H' and the brush O or any of the brushes O' are in contact, a new set of contacts—viz., the long contacts shown at 60 and 61, respectively—will be brought in contact with the brushes 25, 27, 29, and 30, which again reverses the connections of the armature or armatures and field, the reversing-switch G remaining in either of its positions unchanged, and it is this reversal action of the reversing-switch I which is depended upon to convert the motor or motors M into generators.

Assuming now that the generation of current is going forward and that one of the brushes O' is in contact with the segment H', the circuit traversed by the current will be seen to be as follows: emanating at brush attached to wire 28 will flow backwardly through wire 28, as indicated by the dotted arrow-heads, brush 27, contact 60, brush 30, brush 31, thence following the circuits through the field Fe to wire 34 35, segment H', off the farthest brush to the left O' which happens to be in contact at the instant with the segment H', through the resistance R, wire 62, in direction of the dotted arrow-heads, arriving at wire 63, passing the flexible wires into the brake-magnet L L, back by wire 64, joining and passing up wire 65 to the grasping or brake magnet h', whereby the action of the controller is retarded, wire 66 to wire 19, brush 20, contact 21, contact 22, brush 23, wire 24, brush 25, contact 61, brush 29, wire 67, in the direction of the dotted arrow-head, to the opposite brush of the motor or motors M, thus completing the circuit. The amount of current thus flowing will be dependent, first, upon the speed of the motor or motors; secondly, upon the amount of resistance R included in the circuit, and, thirdly, upon the amount of effort given to rotating the shaft f of the controller against the gripping or retarding magnet h'. The mechanical energy required for rotation of the armature or armatures A A of the motor which are geared to the driving-wheels w w of the carriage will effectually retard their motion and tend to bring the carriage quickly to rest.

The shaft f of the controller is provided with a disk h, which revolves before the brake-magnet h', shown in section, a coil of which is shown to be circular, at h''. The magnet h' is stationary, and when energized serves to retard to a greater or less degree the action of the controller. This retardation may be adjusted by the strength of the magnet and also is under automatic control by the strength of the current. Any device for retardation of the controller-handle, preferably the one in the braking positions, will serve the purpose, and I therefore will not limit myself to the special design shown.

It will be readily understood that while it is designed to use the above parts in the relation shown, yet some may be used without the others, and the invention extends to such use. It will furthermore be readily understood that while the detailed construction has been described with more or less minuteness, yet the invention should be in no wise restricted to the exact methods and details described, but rather should be limited only in scope, as indicated in the claims.

Having thus described my invention, what I claim as new, and desire to secure by Letters Patent, is—

1. In a vehicle, a source of electrical supply, a dynamo-electric machine, used as both motor and generator, for braking, a reverse-switch in the armature-circuit of electric machine, a power-circuit, a brake-circuit, a conductor forming a part of each circuit, an ammeter located in the conductor between the machine and the said source of supply.

2. In a vehicle, a source of electrial supply, a dynamo-electric machine, used for both a motor and generator, for braking, a controller for the vehicle, a reverse-switch in the armature-circuit of the electric machine, a power-circuit, a brake-circuit, a conductor forming a part of each circuit, an ammeter located in the conductor between the field of the second machine and the said controller.

3. In a vehicle, a storage battery, a series motor, a reverse-switch in the armature-circuit, an ammeter in the outer field-circuit, a reverse-switch for the ammeter and a charging-terminal connected in circuit, between the ammeter and the motor.

4. In a vehicle, a moving controller, a series motor, a field-shunt for the motor, a contact for the shunt on the moving controller, connections from the field to the controller, an ammeter located in such connection and a conductor leading from said contact to the connection at a point between the ammeter and the field.

5. In a controlling system for electric vehicles, a motor, employed also as a generator, for braking, a source of electrical supply, a switch as T, located in the motor-circuit, a mechanical brake for the vehicle and a common actuator for the brake and the switch in combination with a shunt for the switch in the braking-circuit.

6. In a controlling system for electric vehicles, a motor, employed also as a generator, for braking, a source of electrical supply, a switch as T located in the motor-circuit, a shunt for the switch in the braking-circuit, a mechanical brake for the vehicle, a lever for controlling the brake and an operating connection from the lever to the switch.

7. In an electric vehicle, storage batteries, a motor for the vehicle, a charging-terminal for the batteries and two switches as G and T in series-circuit relation in the motor-circuit between the charging-terminal and the batteries, for the purpose specified.

8. In a vehicle, a battery, a meter-coil, an artificial resistance adapted to be thrown in series with the meter-coil, a meter-shunt in the battery-circuit, a circuit from the coil to the shunt and a switch in the last-named circuit.

9. In a vehicle, a battery, a meter-coil, an artificial resistance adapted to be thrown in series with the meter-coil, a meter-shunt in the battery-circuit, a circuit from the coil to the shunt, a reversing-switch in the last-named circuit and an independent connection from the free end of the resistance to the battery.

10. In a vehicle, a battery, a meter-coil, an artificial resistance adapted to be thrown in series with the meter-coil, a meter-shunt in the battery-circuit, a circuit from the coil to the shunt, a reversing-switch in the circuit, an independent connection from the free end of the resistance to the battery and a switch in connection with the resistance.

11. In a vehicle, an electric generator, a meter-coil an artificial resistance adapted to be thrown in series with the meter-coil, a meter-shunt in the generator-circuit, a circuit from the coil to the shunt, an additional connection from the free end of the resistance to the generator-circuit and a switch connected for throwing the coil to the resistance or to the shunt.

12. In a vehicle, an electric generator, a meter-coil, an artificial resistance adapted to be thrown in series with the coil, a meter-shunt in the generator-circuit and a circuit from the coil to the shunt, an independent connection from the free end of the resistance to the generator, with a switch-contact in each of the circuits, a third circuit from the free end of the meter-coil, to a suitable point on the generator-circuit, in combination with a two-scale face for the meter.

13. In a vehicle, an electric generator, a meter-coil, an artificial resistance adapted to be thrown in series with said coil, a charging-terminal for the generator, a meter-shunt in the battery-circuit, between the terminal and the generator, a circuit from the coil to the shunt, an independent connection from the free end of the resistance to the generator, a switch for the said two circuits, in combination with a reversing-switch between the meter-shunt and the aforementioned switch.

14. In an electric system, a plurality of electric generators, a parallel-series controller, provided with contacts for the generator-circuits, a translating device, a main circuit therefor, in combination with a switch, as T, having three or more terminals, one in connection with the parallel contacts of the said controller and another connected with one of the generators, substantially for the purpose specified.

15. In a vehicle, a battery, a meter-coil, an artificial resistance, adapted to be thrown in series with the coil, a meter-shunt in the battery-circuit and a circuit from the coil to the shunt, an independent connection from the free end of the resistance to the battery, a switch in each of the circuits, a third circuit from the free end of the meter-coil to a suitable point on the battery-circuit, in combination with a switch, as into the last-named circuit.

ELMER A. SPERRY.

Witnesses:
M. C. Prendergast,
W. S. Rogers.